Figure 1:
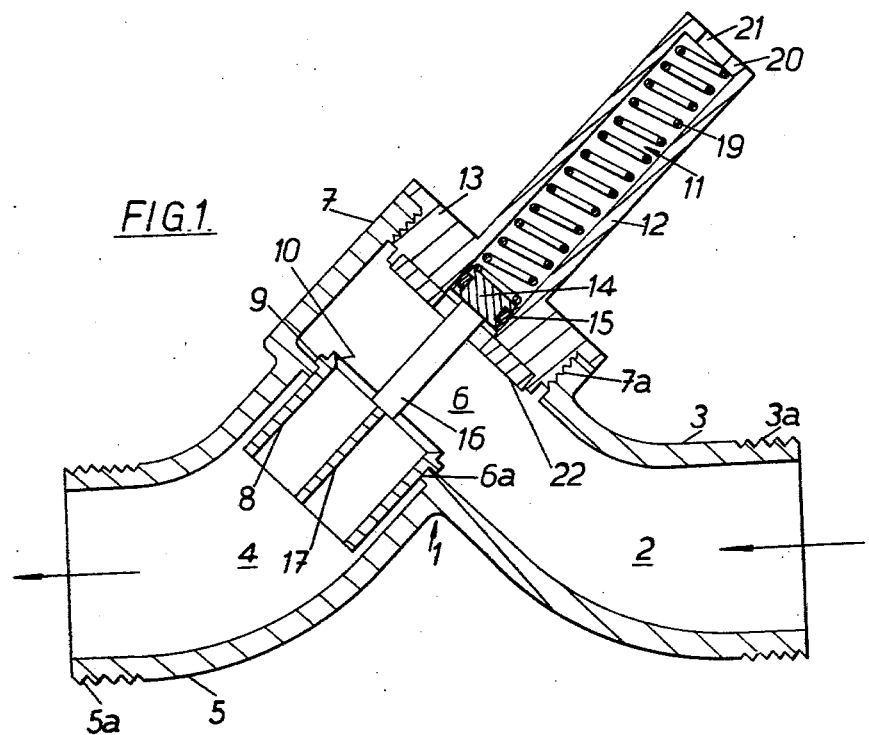

United States Patent

Mehoudar

[11] 4,187,873
[45] Feb. 12, 1980

[54] PRESSURE REGULATORS

[76] Inventor: Raphael Mehoudar, 36 Yehuda Hanassi St., Tel Aviv, Israel

[21] Appl. No.: 327,631

[22] Filed: Jan. 29, 1973

[30] Foreign Application Priority Data

Feb. 9, 1972 [IL] Israel .................................. 38733

[51] Int. Cl.² .................................................. F16K 31/122
[52] U.S. Cl. ................................ 137/505.13; 137/505.18
[58] Field of Search .............. 137/505.18, 220, 505.13, 137/508; 251/282

[56] References Cited

U.S. PATENT DOCUMENTS

| | | | |
|---|---|---|---|
| 2,921,603 | 1/1960 | Lofink | 251/282 X |
| 2,970,806 | 2/1961 | Rexford | 251/282 X |
| 3,035,607 | 5/1962 | Quenneville | 137/505.18 |
| 3,125,115 | 3/1964 | Gard | 137/505.18 X |
| 3,168,106 | 2/1965 | Volk | 137/505.18 |
| 3,533,434 | 10/1970 | Smith | 137/220 |
| 3,605,800 | 9/1971 | Satoh | 137/505.18 |

Primary Examiner—Martin P. Schwadron
Attorney, Agent, or Firm—Sandler & Greenblum

[57] ABSTRACT

A pressure regulator valve comprising a housing having formed therein inlet and outlet chambers and an intermediate zone effecting communication between the chambers, a tubular sleeve slideable in the outlet chamber within a narrow annular flange integral with the housing and into and out of the intermediate zone so as to vary the available through-flow cross-section for fluid flow from the inlet chamber via an effective annular region into the intermediate zone, said sleeve, apart from a narrow length thereof adjacent said flange, being spaced from the walls of the housing so as to define therebetween regions to which the fluid has free access, a pressure displaceable element coupled to the sleeve while allowing for fluid flow through the sleeve and sealingly displaceable within a port located in the housing upstream of said sleeve and being exposed to a controlled pressure zone, biasing means acting on said element so as to bias the sleeve into said outlet chamber, a valve seating mounted in the housing and adapted to be engaged in end-on, substantially line contact by the adjacent sleeve edge so as to close the intermediate zone to throughflow, and means for limiting the axial displacement of the sleeve or the element in a downstream direction, the arrangement being such that said throughflow passes out of said outlet chamber via said sleeve.

1 Claim, 1 Drawing Figure

PRESSURE REGULATORS

This invention relates to a pressure regulator valve of the kind designed to regulate fluid flow pressure in a fluid flow system and in particular to ensure that the fluid pressure in the system downstream of the valve is maintained substantially constant and independent of variations in the fluid pressure upstream of the valve or of variations in the flow rate.

Hitherto proposed pressure regulator valves which have fulfilled these requirements have been of relatively sophisticated design and complicated construction and as a consequence are expensive and generally require frequent servicing.

On the other hand, many relatively simple pressure regulator valves have been proposed over a considerable period of time which, whilst being characterized by a relatively small number of parts, have in general not provided satisfactory pressure regulation on the lines indicated above.

It is an object of the present invention to provide a new and improved pressure regulator valve which, whilst being of relatively simple, inexpensive construction, nevertheless achieves to a substantial degree the high level of pressure control which was previously the characteristic of the more sophisticated expensive valves.

According to the present invention there is provided a pressure regulator valve comprising a housing having formed therein inlet and outlet chambers and an intermediate zone effecting communication between the chambers, a tubular sleeve slidable in the outlet chamber within a narrow annular flange integral with the housing and into and out of the intermediate zone so as to vary the available through-flow cross-section for fluid flow from the inlet chamber via an effective annular region into the intermediate zone, said sleeve, apart from a narrow length thereof adjacent said flange, being spaced from the walls of the housing so as to define therebetween regions to which the fluid has free access, a pressure displaceable element coupled to the sleeve whilst allowing for fluid flow through the sleeve and sealingly displaceable within a port located in the housing upstream of said sleeve and being exposed to a controlled pressure zone, biasing means acting on said element so as to bias the sleeve into said outlet chamber, a valve seating mounted in the housing and adapted to be engaged in end-on, substantially line contact by the adjacent sleeve edge so as to close the intermediate zone to throughflow, and means for limiting the axial displacement of the sleeve or the element in a downstream direction, the arrangement being such that said throughflow passes out of said outlet chamber via said sleeve.

Preferably, the pressure displaceable element is constituted by a piston sealingly slideable within said port which port can, in its turn form part of a vented piston chamber formed in said housing.

The present invention has arisen out of an investigation of the main factors which have limited the effectiveness of the hitherto proposed regulator valves and especially those of relatively simple design. Thus, on the one hand hitherto proposed regulator valves have in general required the provision of, at least two, seals formed of rubber or the like, each seal generally serving to separate zones of widely differing prevailing pressures as a consequence of which an excessive frictional resistance to the movement of the displaceable pressure regulating elements is generated. Furthermore, and most significantly, all such seals, when operating under such differential pressure conditions, exhibit a substantial degree of mechanical hysteresis and this hysteresis is multiplied as the number of seals is increased.

In the regulator in accordance with the present invention on the other hand, only one seal is absolutely called for, namely, the seal associated with the displaceable element and even this seal is exposed only to the controlled pressure rather than to the greater, uncontrolled, supply pressure. In this way frictional resistance and hysteresis is reduced.

Another factor which has been found to contribute to the relatively inefficient operation of simple known regulator valves is the frictional resistance to movement of the displaceable regulator member which arises out of the fact that this member is subjected, at times, to substantial supply pressures which act on the displaceable member, usually in a preferred transverse direction and can result in extreme cases in the effective jamming of the displaceable member in its housing. With the realization of this factor, the regulator valve in accordance with the present invention has been designed so as to cope with it by ensuring that the displaceable member, in the form of the tubular sleeve, is effectively surrounded by the supply and/or controlled fluid and in this way it is ensured that the sleeve is fully balanced with respect to the fluid pressures.

A further drawback which has been found to occur in known pressure regulator valves of the simple kind arises in view of the fact that these valves are often provided with relatively sliding seals. The provision of such sliding seals introduces an additional element of frictional resistance and the performance of such seals is very much influenced by the presence of solid impurities in the fluid to be controlled. Thus, if such impurities in the form of grit, gravel or the like become interposed between the sliding seals the entire displaceability of the regulator member can be destroyed. The regulator valve in accordance with the present invention on the other hand reduces to a minimum the disadvantages inherent in the provision of such sliding seals by ensuring that the cut-off of the through-flow through the valve is effected as a result of end-on, substantially line contact of the edge of the tubular sleeve and an appropriate valve seating.

It is the unique combination of all these features which leads to the provision of a pressure regulator valve in accordance with the present invention where a substantially constant outlet pressure can be achieved despite substantial fluctuations in supply pressure or flow rate. Furthermore, by virtue of the fact that flow takes place through the displaceable regulator member, namely, the tubular sleeve, a minimum amount of pressure loss occurs when the regulator valve is fully open. On the other hand, the fact that the regulator member (i.e. the tubular sleeve) is essentially located in the outlet chamber leads to the provision of a very compact structure which is of course advantageous when the valve has to be fitted in a relatively confined space.

For a better understanding of the present invention, and to show how the same may be carried out in practice reference will now be made to the accompanying drawing which is a sectional view of the preferred embodiment of the invention.

As seen in FIG. 1 the pressure regulator valve comprises a housing 1 having formed therein an inlet chamber 2, defined within an inlet conduit 3 having an outwardly threaded end portion 3a and an outlet chamber 4, defined within an outlet conduit 5 having an externally threaded end portion 5a. The chambers 2 and 4 communicate with each other via an intermediate zone 6.

A narrow, inwardly directed, annular flange 6a is formed integrally with an upstream end of the outlet conduit 5. The outlet conduit 5 merges continuously with an intermediate chamber 7 into which the inlet conduit 2 opens and which is provided with an internally threaded mouth 7a, the intermediate conduit 7 defining therein the intermediate zone 6.

A tubular sleeve 8 is slideable in the outlet chamber 4 within the flange 6a and is formed at an upstream end thereof with an externally directed shoulder 9 which serves as a limiting stop. The upstream edge 10 of the sleeve 8 is conically bevelled, the edge tapering from a maximum diameter equal to the external diameter of the sleeve to a minimum diameter equal to the internal diameter of the sleeve.

A piston chamber 11 is formed within a tubular conduit 12 which extends centrally from an annular base member 13 which is externally screw threaded so as to be screw fitted into the internally threaded mouth of the intermediate conduit 7. A piston 14 is slideable in the tubular conduit 12, the piston being fitted with a peripheral sealing ring 15. The piston is integrally coupled to the tubular sleeve 8 by means of a coupling rod 16 which is integrally formed, via a radial spider structure 17 with the sleeve 8.

Located in the piston tube 12 is a compression spring 19 which bears at one end against the piston 14 and at its opposite end against a flanged rim 20 of the tube 12 which flanged rim defines a venting aperture 21.

The compression spring 19 biases the piston 14 towards the intermediate zone 6 and in consequence the sleeve 8 is biased into the outlet chamber 4, i.e. into the position wherein the regulator valve is fully opened. The provision of the shoulder 9 serves to limit the degree of inward displacement of the sleeve 8 in the outlet chamber 4.

An annular valve seating 22 formed of rubber or like flexible material is set into a corresponding annular recess formed in the surface of the base member 13 exposed to the intermediate zone 6.

In use the regulator valve just described is connected in series in a fluid flow system wherein the fluid flow pressure is to be controlled. For this purpose the inlet end 3a of the valve is screwed to an inlet pipe of the system whilst the outlet end 5a is screwed to an outlet pipe of the system.

As long as the input flow pressure does not exceed a predetermined maximum, fluid will flow freely through the system via the inlet chamber 2, an effective annular region, the intermediate zone 6, the tubular sleeve 8 and the outlet chamber 4; the tubular sleeve 8 offering minimal resistance to flow in view of its substantially open construction. Under these conditions the regulator valve is fully open the sleeve 8 being biased fully into the outlet chamber 4 by means of the compression spring 19. Thus, the fluid passing into the intermediate zone 6 acts on the exposed face of the piston 14 and exerts thereon a pressure which is at least counterbalanced by the biasing force of the spring 19.

If now the supply pressure of the fluid flow exceeds the predetermined maximum, the pressure acting on the exposed face of the piston 14 will outbalance the oppositely directed biasing force of the spring 19 and the piston 14 will be displaced inwardly in the piston tube 12 under the influence of the fluid pressure and in consequence the tubular sleeve 8 will be displaced into the intermediate zone 6 thereby reducing the available cross-section for fluid flow into the intermediate zone 6 from the inlet chamber 2. This reduction of the available throughflow cross-section results in a reduction of the pressure of the fluid in the intermediate zone 6 and, in consequence, in the outlet chamber the controlled pressure never exceeding the predetermined maximum value. A continued rise in the supply pressure tends to lead a greater outlet pressure and this results in greater pressures being exerted on the exposed face of piston 14. As a consequence there will be an increased displacement of the piston 14 within the piston chamber 11 and increased displacement of the sleeve 8 into the intermediate zone 6 and the piston is now exposed to the effectively controlled pressure. In the extreme condition the displacement of the sleeve 8 into the intermediate zone 6 is sufficient for the edge 10 of the sleeve 8 to make substantially end-on line contact with the valve seating 22 in which case throughflow in the valve is substantially interrupted.

From the above description it will be seen that, in the embodiment described, the piston 14 and in particular its associated sealing ring 15 is exposed to the controlled pressure which is in all cases not greater than, and in most cases much less than, the supply pressure. In view of the fact that the frictional resistance to movement of the sliding seal constituted by the O-ring 15 depends on the differences of pressure acting thereon these differences of pressure are less than they would be if the piston and its sealing ring were exposed to the inflowing pressure. In consequence the mechanical hysteresis exhibited by this seal is correspondingly less than it would be if the seal were exposed to the inflowing pressure.

Furthermore, it will be realised that, in the embodiment just described the sliding seal 15 constitutes in fact the only sliding seal in the valve and the deleterious effect on the performance of the valve as a result of mechanical hysteresis is limited to one seal only. The tubular sleeve 8 is itself not associated with any such sliding seal, it being slideable within the flange 6a and the close sliding fit of the external surface of the sleeve 8 and the internal surface of the flange 6a avoids any significant leakage and is, under most conditions of operation sufficient to avoid the necessity of providing an additional sliding seal which would of necessity contribute an additional factor of mechanical hysteresis.

As can be clearly seen in FIG. 1 of the drawings the tubular sleeve 8 is spaced from the housing walls over its entire length (apart from a narrow region adjacent the flange 6a) and in this way there are defined, on either side of the flange 6a, a pair of zones to which the fluid in the intermediate zone and outlet chamber has free access. This leads to the effective balancing of the sleeve in that it is not subject to any unbalanced transversely directed forces. Thus, in any axial position of displacement of the sleeve 8 the portion thereof upstream of the flange 6a is surrounded by the inflowing fluid which acts on it equally in all radial directions and there is therefore no question here of the movement of the sleeve 8 being influenced or interfered with by transversely directed pressures in preferential directions. Similarly, any variations in the inflowing pressure are transmitted equally in all directions to the sleeve 8.

Similarly, the controlled outflowing fluid in the discharge chamber 4 surrounds the portion of the sleeve downstream of the flange 6a and acts on the sleeve equally in all directions.

The fact that the sleeve is spaced over the overwhelming proportion of its length from the housing walls also ensures that jamming of the sleeve by the interposition or accumulation of sediment, etc. is substantially prevented.

Furthermore, by providing the sleeve with a tapering end 10 the edge thereof designed to establish end-on line contact with the valve seating 22 having a diameter substantially equal to the external diameter of the sleeve itself ensures that substantially no unbalanced axially directed forces act on the sleeve ends as a result of the fluid flow. Thus, the fluid pressure acting on the tapering end 10 will be the controlled fluid pressure as is the fluid pressure acting on the downstream end of the sleeve, these two pressures which are oppositely directed are substantially equal and therefore cancel each other out. This construction therefore of the upstream end of the sleeve 8 contributes to the full hydrodynamic balancing of the sleeve. Total cut-off of the regulator valve is effected by end-on line contact of the edge of the sleeve end 10 with the valve seating 25. This end-on line contact is free from the disadvantages discussed above inherent in the hitherto known sliding seals.

The presence of the tubular sleeve in the discharge chamber provides minimal resistance to flow and this minimal resistance can be further decreased by increasing the inner diameter of the sleeve whilst the structure of the central support spider can be so designed as to introduce a minimal resistance to through-flow.

On the other hand, it is a distinct advantage of the valve design in accordance with the present invention, as compared with hitherto proposed valves incorporating sleeve-like displaceable regulator elements, that the pressure displaceable element i.e. the piston can be of substantially smaller diameter than the sleeve and as the result of the use of such relatively small pistons relatively small spring biasing forces need be exerted. In consequence the small piston and springs can be accommodated in a very much more compact space thereby allowing for the more varied use of the valve and for the reduction in costs of production. It will of course be realised that the higher the operating pressure the smaller the piston and the associated springs can be.

It will furthermore be realised the construction of the valve in such a manner that closure is ensured by end-on line contact has the advantage that wear of the relatively displaceable valve elements does not effect the degree of closure of the valve, seeing that the effects of wear are overcome by merely pushing the displaceable elements into effective contact.

Whilst in the embodiment described above the pressure displaceable element has been constituted by a piston slideable in a piston housing, the element can be suitably constituted by a flexible diaphragm or bellows mounted in a port and displaceable in response to pressure variations. Similarly the element, e.g. a piston and its biasing spring need not be accommodated in a single piston housing. Thus the piston or other displaceable element may be accommodated in the appropriate port and the spring can be guided in another structure.

I claim:
1. A liquid pressure regulator comprising:
 (a) a body having a liquid flow inlet chamber connected to a liquid flow outlet chamber by an intermediate zone;
 (b) an inwardly directed flange on the body establishing an axially narrow cylindrical guide surface, and a piston cylinder in the body opposite to and coaxial with the guide surface, one end of the cylinder being vented and the other end being open to the intermediate zone;
 (c) a valve seat surrounding the open end of the piston cylinder and exposed to the intermediate zone;
 (d) a movable member having a tubular sleeve with an upstream edge, a coaxial piston opposite the upstream edge, and coupling means interconnecting the sleeve and the piston so that both move axially as a unit;
 (e) the member being mounted in the body so that the sleeve slidably engages the guide surface and the piston slidably engages the piston cylinder, the sleeve being movable in the intermediate zone between a fully open position at which the upstream edge is maximally spaced from the valve seat, and a substantially closed position at which the upstream edge is in substantially end-on line contact with the valve seat;
 (f) a resilient seal on the piston sealingly engaged with the cylinder and sealingly separating the vented end of the cylinder from the open end;
 (g) a spring acting on the piston for resiliently urging the member toward its maximally open position; and
 (h) the upstream edge of the sleeve being coaxially bevelled and inwardly tapering from a maximum diameter substantially equal to the external diameter of the sleeve to a minimum diameter substantially equal to the internal diameter of the sleeve.

* * * * *